No. 748,327. PATENTED DEC. 29, 1903.
E. H. WHITING.
HUB FOR VEHICLE WHEELS.
APPLICATION FILED MAY 23, 1903.
NO MODEL.

Witnesses
Chas. P. Day.
E. J. Ogden

Inventor
EDMUND H. WHITING
By
Howard E. Barlow
Attorney

THE NORRIS PETERS CO., PHOTO-LITHO., WASHINGTON, D. C.

No. 748,327.

Patented December 29, 1903.

UNITED STATES PATENT OFFICE.

EDMUND H. WHITING, OF PROVIDENCE, RHODE ISLAND.

HUB FOR VEHICLE-WHEELS.

SPECIFICATION forming part of Letters Patent No. 748,327, dated December 29, 1903.

Application filed May 23, 1903. Serial No. 158,493. (No model.)

*To all whom it may concern:*

Be it known that I, EDMUND H. WHITING, a resident of Providence, in the county of Providence and State of Rhode Island, have invented certain new and useful Improvements in Hubs for Vehicle-Wheels; and I do hereby declare that the following is a full, clear, and exact description thereof, reference being had to the accompanying drawings, and to the letters of reference marked thereon, which form a part of this specification.

This invention relates to wheel-hubs for vehicles, and has for its primary object the construction of a wheel-hub that contains one or more flexible packings or cushions which receive and absorb the shocks and jars that would otherwise be transmitted to the vehicle and its occupants from contact of the tire with the pavements or obstructions over which the wheels may roll. This construction in a measure takes the place of the rubber tire, the flexible surface to take the shocks and jars being placed in the hub instead of on the periphery of the rim.

The invention is fully described in this specification and illustrated in the accompanying drawings.

Figure 1:
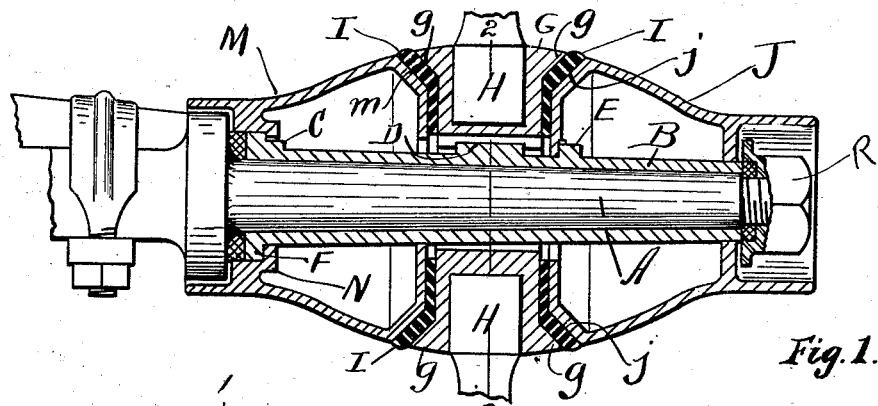
Figure 2:
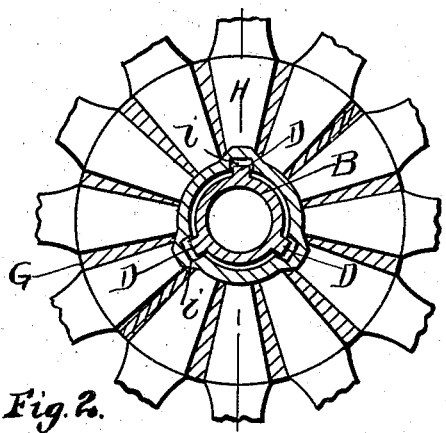
Figure 4:
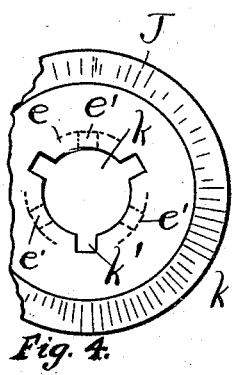
Figure 3:
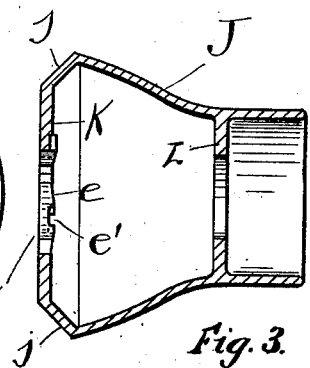
Figure 7:
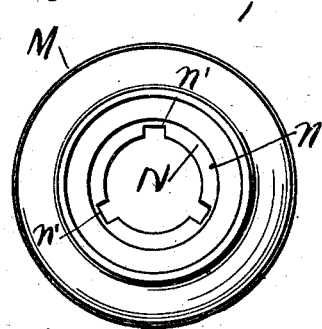
Figure 5:
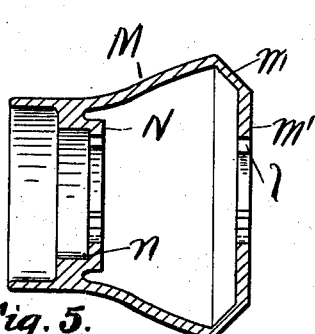
Figure 6:
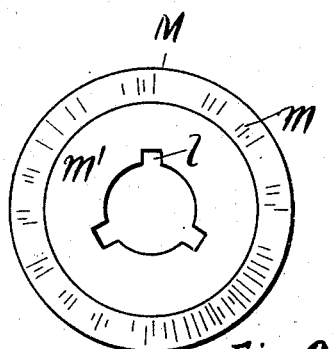
Figure 8:
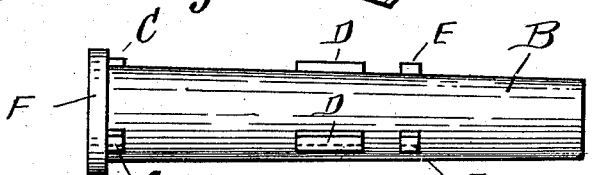

Figure 1 is a central longitudinal section of the hub on line 1 1 of Fig. 2, showing the axle and spokes in full. Fig. 2 is a central transverse section of the hub on line 2 2 of Fig. 1 with the axle removed. Fig. 3 is a central longitudinal section of the outer end of the hub-shell. Fig. 4 is a view of the large end of Fig. 3, showing the slots through which the locking-lugs pass. Fig. 5 is a central longitudinal section of the inner end of the hub-shell. Fig. 6 is a view of the large end of Fig. 5. Fig. 7 is a view of the small end of Fig. 5. Fig. 8 is a view in elevation of the axle-sleeve, showing the lugs located on it.

Referring to the drawings, A is the bearing portion of the ordinary carriage-axle, made slightly tapering where the hub turns on it, and B is the shell or sleeve which fits and turns on said axle with the rotation of the wheel. On this shell are located three driving-lugs C C C under the head of collar F.

D D D are stationary keys or driving-lugs located approximately in the middle of the sleeve, and E E E are lock-lugs which serve to bind and lock the three members of the hollow hub together.

G is the narrow center member of this sectional metallic hub into which the radial spokes H are set. Extending outward and around the top edge on both sides of this middle member are beveled flanges $g\ g$, on which the weight of the vehicle is carried on the flexible packings or rings I I. The center of this middle member has a hole cored through it, (see Fig. 2,) radiating from which hole are three slots $i$ to receive the keys or driving-lugs D on the sleeve B. The outer end member J of the hub is a hollow metallic shell and has a head K at its inner or largest end and a partition L nearer its outer or small end. Around the outer edge of the large end the edge is beveled back at $j$, forming a surface on which the flexible ring I may be supported. Through the head K is cast a hole $k$, and radiating from this hole are three recesses $k'$, through which are admitted the locking-lugs E, which pass through these recesses and engage the slightly-inclined surfaces $e$. By holding the center and remaining portion of the wheel and turning this end member about one-third around the lugs E are forced over these slight inclines $e$ and drop into the recesses $e'$, made to receive and retain them. The partition L is for the purpose of supporting the end of the sleeve B, which projects through the hole made to receive it, and also serves to keep the wheel from coming off of the axle when the nut R is in place.

The inner member M of the hub is similar in construction to that of the outer member J. It has a head $m'$ at its large end beveled on its outer periphery at $m$ to form the support for the flexible ring I. This head has a hole (see Fig. 6) through which the axle-sleeve passes. This hole also has three radiating slots $l$, through which the lugs D and E may pass in assembling the parts as the sleeve is pushed through to lock the three members in together. Near the inner or small end of this member M is a partition N, which is recessed out at $n$ to receive the head F of the sleeve B. Through this partition is a hole with three radiating slots $n'$, which slots receive the retaining-lugs C C C under the head of said sleeve. These lugs act as keys to insure the inner end member to turn with the center and outer end members.

The operation of the invention is further explained, as follows: My improved hub is made in three sections M, G, and J, the two end sections being hollow metallic shells which are very light and strong. Between each of the end members and the middle section is interposed a thick rubber washer or ring, the upper edge of which flares outwardly and lies between the inclined surfaces $m$ and $j$ of the two end members and the corresponding incline-flanges $g\ g$ of the middle section. These three sections are all drawn tightly together and securely locked in place by the lock-lugs E on the sleeve B in the manner described above. This method of locking effectually avoids the necessity of bolts to hold these three members together. The hole in the middle section G is cut out large enough so as not to bear on the sleeve B, leaving it entirely supported on these rubber cushions I I. As the vehicle is supported directly on this middle section G through the spokes from the tire of the wheel, it is obvious that all of the shocks and jars from the rolling of the tire against obstructions must be absorbed in these cushions.

By my method of placing the rubber in the hub instead of on the rim of the wheel I produce in a measure the result sought to be obtained by the rubber tire with but a small portion of the expense, both in the first cost of the tires and the continual expense of keeping them in repair.

By the use of my improved method of locking the sectional hubs together it is very easy to take them apart to repair or to replace the flexible packing when worn.

This hub is very practical in construction and inexpensive to manufacture.

Having thus described my invention, what I claim as new, and desire to secure by Letters Patent, is—

1. In a hub for a wheel, composed of an intermediate section said section having flanges overlapping the edge of the adjacent sections, flexible rings interposed between said flanges and suitable faces on said adjacent sections on which said intermediate section is supported, a sleeve passing through said members, lugs on said sleeve by which the members are held in line with each other and also lugs on said sleeve by which all of these members are locked together, substantially as described.

2. In a wheel, a separable hub having a plurality of members, flexible cushions interposed between the central and adjacent members on which said central member is supported, a sleeve passing through said members, a head on the inner end of said sleeve, lugs on said sleeve to engage the inner wall of the head of the outer end member, by which all of said members are drawn together and locked firmly in place, substantially as described.

3. In a hub for a wheel, composed of an intermediate section said section having flanges overlapping the edge of the adjacent sections, flexible rings interposed between said flanges and said adjacent sections on which said intermediate section is supported, a sleeve passing through said members a head on the inner end of said sleeve, lugs on said sleeve to engage the inner wall of the head of the outer end member, by which all of said members are drawn together and locked firmly in place, substantially as described.

In testimony whereof I have hereunto set my hand this 13th day of May, A. D. 1903.

EDMUND H. WHITING.

In presence of—
HOWARD E. BARLOW,
CHAS. P. DAY.